United States Patent
He et al.

(10) Patent No.: US 10,755,174 B2
(45) Date of Patent: Aug. 25, 2020

(54) UNSUPERVISED NEURAL ATTENTION MODEL FOR ASPECT EXTRACTION

(71) Applicant: SAP SE, Walldorf (DE)

(72) Inventors: Ruidan He, Singapore (SG); Daniel Dahlmeier, Singapore (SG)

(73) Assignee: SAP SE, Walldorf (DE)

( * ) Notice: Subject to any disclaimer, the term of this patent is extended or adjusted under 35 U.S.C. 154(b) by 783 days.

(21) Appl. No.: 15/484,577

(22) Filed: Apr. 11, 2017

(65) Prior Publication Data

US 2018/0293499 A1 Oct. 11, 2018

(51) Int. Cl.
| | |
|---|---|
| *G06N 3/08* | (2006.01) |
| *G06N 3/04* | (2006.01) |
| *G06F 40/30* | (2020.01) |
| *G06F 40/216* | (2020.01) |
| *G06F 40/289* | (2020.01) |

(52) U.S. Cl.
CPC ............ *G06N 3/088* (2013.01); *G06F 40/216* (2020.01); *G06F 40/289* (2020.01); *G06F 40/30* (2020.01); *G06N 3/0454* (2013.01)

(58) Field of Classification Search
CPC .............................. G06F 40/30; G06F 16/3329
USPC ................................................ 706/15, 45, 47
See application file for complete search history.

(56) References Cited

U.S. PATENT DOCUMENTS

| | | | |
|---|---|---|---|
| 9,336,776 B2 | 5/2016 | Dahlmeier et al. | |
| 9,977,778 B1* | 5/2018 | Perez ..................... | G06F 16/367 |
| 2012/0209751 A1 | 8/2012 | Chen et al. | |
| 2016/0110343 A1* | 4/2016 | Kumar Rangarajan Sridhar ........ | H04W 4/14 704/9 |
| 2016/0247061 A1* | 8/2016 | Trask ........................ | G06N 3/02 |
| 2017/0024455 A1 | 1/2017 | Powell et al. | |
| 2017/0053646 A1* | 2/2017 | Watanabe ............... | G10L 15/22 |
| 2017/0103324 A1 | 4/2017 | Weston et al. | |
| 2017/0193098 A1 | 7/2017 | Randhawa et al. | |
| 2018/0203848 A1* | 7/2018 | Perez ...................... | G10L 25/30 |

(Continued)

OTHER PUBLICATIONS

Mikolov et al. "*Efficient Estimation of Word Representations in Vector Space*"; In Proceedings of Workshop at ICLR, 2013; arXiv. org 1301.3781; Pub. Sep. 7, 2013; 12 pages.

(Continued)

*Primary Examiner* — David R Vincent
(74) *Attorney, Agent, or Firm* — Fish & Richardson P.C.

(57) ABSTRACT

Methods, systems, and computer-readable storage media for receiving a vocabulary, the vocabulary including text data that is provided as at least a portion of raw data, the raw data being provided in a computer-readable file, associating each word in the vocabulary with a feature vector, providing a sentence embedding for each sentence of the vocabulary based on a plurality of feature vectors to provide a plurality of sentence embeddings, providing a reconstructed sentence embedding for each sentence embedding based on a weighted parameter matrix to provide a plurality of reconstructed sentence embeddings, and training the unsupervised neural attention model based on the sentence embeddings and the reconstructed sentence embeddings to provide a trained neural attention model, the trained neural attention model being used to automatically determine aspects from the vocabulary.

17 Claims, 5 Drawing Sheets

(56) References Cited

U.S. PATENT DOCUMENTS

2018/0285344 A1   10/2018   He et al.

OTHER PUBLICATIONS

Mikolov et al. "*Distributed Representations of Words and Phrases and Their Compositionality*"; Proceeding NIPS'13 of $26^{th}$ International Conference on Neural Information Processing Systems, arXiv:1310.4546; Pub. Dec. 5, 2013; 9 pages.

Faruqui et al. "*Retrofitting Word Vectors to Semantic Lexicons*"; Human Language Technologies: The 2015 Annual Conference of the North American Chapter of the ACL, pp. 1606-1615, Denver, CO, USA; May 31-Jun. 5, 2015; © 2015 Association for Computational Linguistics.

Ruidan He and Daniel Dahlmeier, "*Simple and Effective Unsupervised Aspect Extraction with Word Embeddings*", 9 pages.

U.S. Appl. No. 15/478,363, filed Apr. 4, 2017, He et al.

U.S. Office Action in U.S. Appl. No. 15/478,363, dated Jul. 9, 2018, 16 pages.

\* cited by examiner

UNSUPERVISED NEURAL ATTENTION MODEL FOR ASPECT EXTRACTION

BACKGROUND

Aspect-based sentiment analysis includes the machine processing of text to determine aspects (e.g., topics) that the text refers to, as well as a sentiment conveyed for aspects. Aspect extraction is an important and challenging task in aspect-based sentiment analysis. In some techniques, variants of topic models are adopted to infer aspects (topics) from text in an unsupervised setting. However, the preference for aspect semantic coherence is not directly encoded in topic models. As a result, aspects inferred by topic models can often mix loosely related aspect terms.

SUMMARY

Implementations of the present disclosure include computer-implemented methods for aspect extraction using an unsupervised neural attention model. In some implementations, actions include receiving a vocabulary, the vocabulary including text data that is provided as at least a portion of raw data, the raw data being provided in a computer-readable file, associating each word in the vocabulary with a feature vector, providing a sentence embedding for each sentence of the vocabulary based on a plurality of feature vectors to provide a plurality of sentence embeddings, providing a reconstructed sentence embedding for each sentence embedding based on a weighted parameter matrix to provide a plurality of reconstructed sentence embeddings, and training the unsupervised neural attention model based on the sentence embeddings and the reconstructed sentence embeddings to provide a trained neural attention model, the trained neural attention model being used to automatically determine aspects from the vocabulary. Other implementations of this aspect include corresponding systems, apparatus, and computer programs, configured to perform the actions of the methods, encoded on computer storage devices.

These and other implementations can each optionally include one or more of the following features: each sentence embedding is provided by applying a respective weight to each feature vector, the respective weight indicating a probability that a respective word captures an aspect of the respective sentence, the weight being determined by an attention model; training includes obtaining an objective function based on an unregularized objective, and a regularization term; training includes obtaining a function based on the sentence embeddings and the reconstructed sentence embeddings; each reconstructed sentence embedding is provided by dimension reduction and reconstruction of the respective sentence embedding; each feature vector is provided as a word embedding; and the raw data includes review data.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to aspect extraction using an unsupervised neural attention model. More particularly, implementations of the present disclosure are directed to an unsupervised attention-based aspect extraction model that is trained based on sentence embeddings and reconstructed sentence embeddings. Implementations can include actions of receiving a vocabulary, the vocabulary including text data that is provided as at least a portion of raw data, the raw data being provided in a computer-readable file, associating each word in the vocabulary with a feature vector, providing a sentence embedding for each sentence of the vocabulary based on a plurality of feature vectors to provide a plurality of sentence embeddings, providing a reconstructed sentence embedding for each sentence embedding based on a weighted parameter matrix to provide a plurality of reconstructed sentence embeddings, and training the unsupervised neural attention model based on the sentence embeddings and the reconstructed sentence embeddings to provide a trained neural attention model, the trained neural attention model being used to automatically determine aspects from the vocabulary.

Figure 1:
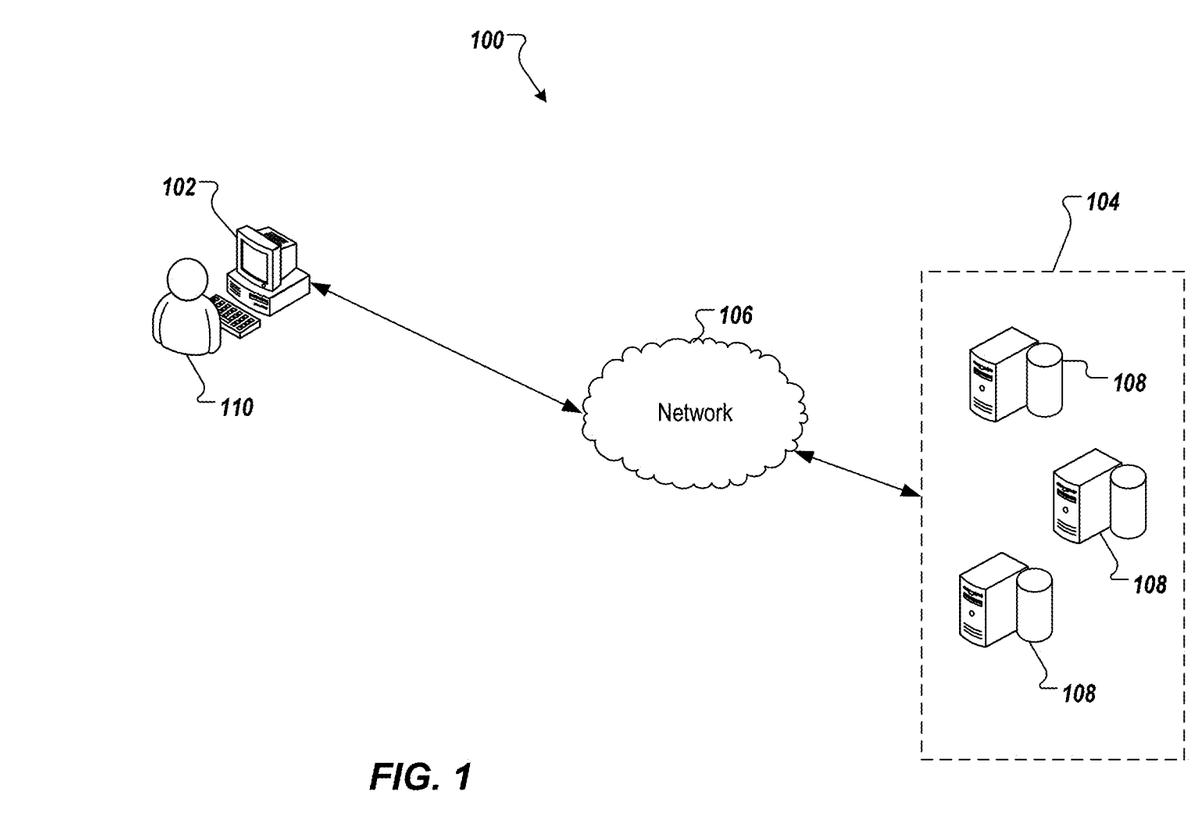
FIG. 1 depicts an example architecture that can be used to execute implementations of the present disclosure.

FIG. 1 depicts an example architecture 100 that can be used to execute implementations of the present disclosure. In the depicted example, the example architecture 100 includes one or more client devices 102, a server system 104 and a network 106. The server system 104 includes one or more server devices 108. In the depicted example, a user 110 interacts with the client device 102. In an example context, the user 110 can include a user, who interacts with an application that is hosted by the server system 104.

In some examples, the client device 102 can communicate with one or more of the server devices 108 over the network 106. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server device 108 includes at least one server and at least one data store. In the example of FIG. 1, the server devices 108 are intended to represent various forms of servers including, but not limited to a web server, an application server, a proxy server, a network server, and/or a server pool. In general, server systems accept requests for application services and provides such services to any number of client devices (e.g., the client device 102) over the network 106.

In accordance with implementations of the present disclosure, the server system 104 can host an aspect-based sentiment analysis service (e.g., provided as one or more computer-executable programs executed by one or more computing devices). For example, input data can be provided to the server system (e.g., from the client device 102), and the server system can process the input data through the aspect-based sentiment analysis service to provide result data. For example, the server system 104 can send the result data to the client device 102 over the network 106 for display to the user 110.

Implementations of the present disclosure are described in detail herein with reference to an example context. The example context includes aspect extraction and sentiment analysis of textual data including review data. Example review data can include user reviews (e.g., customer reviews) provided as text data, each review capturing a respective user's thoughts, opinion, analysis, critique, and/or sentiment on a domain. Example domains include, without limitation, restaurants, hotels, airlines, food, beverage, theater, products, and services. For example, text data can capture user reviews of a restaurant. As another example, text data can capture user reviews of a product. In some examples, users can submit tens, hundreds, thousands of reviews using, for example, third-party services (e.g., submit reviews to a third-party review service, or online retailer (application; website)), and/or to an application/website of a provider (of the reviewed products/services)). It is contemplated, however, that implementations of the present disclosure can be realized in any appropriate context.

Aspect extraction is one of the key tasks in aspect-based sentiment analysis. In general, and with reference to the example context, aspect extraction aims to extract entity aspects (topics), on which opinions have been expressed. For example, in a sentence "The beef was tender and melted in my mouth," the aspect term is "beef" In aspect extraction, multiple sub-tasks are performed. In some examples, these include (1) extracting all aspect terms (e.g., "beef") from a text corpus; and (2) clustering aspect terms with similar meaning into categories, where each category represents a single aspect. (e.g., cluster "beef" "pork," "pasta," and "tomato" into one aspect, "food").

Previous works for aspect extraction can be categorized into three approaches: rule-based, supervised, and unsupervised. Both rule-based methods and supervised learning methods share one major limitation: they do not naturally group extracted aspect terms into categories. In addition, supervised learning requires data annotation and suffers from domain adaptation problems. That is, for example, training data must be labelled, which is time and resource-intensive. Unsupervised methods are adopted to avoid reliance on labeled data needed for supervised learning. Generally, the outputs of those unsupervised methods are word distributions or rankings for each aspect. Aspects are naturally obtained without separately performing extraction and categorization.

Latent Dirichlet Allocation (LDA) has become a popular approach for aspect extraction in an unsupervised setting. LDA has been demonstrated to be useful at inferring aspects and their representative words from text corpora. In view of its popularity, and usefulness different LDA-based models have been developed, which model the text corpora as a mixture of topics (aspects). While the mixture of aspects discovered by LDA may describe the text corpora relatively well, it has been seen that the individual aspects inferred by LDA often consist of various unrelated or loosely related concepts.

The problem of aspect extraction has been well studied, and there are a number of methods proposed that are unsupervised (do not require labelled data), and are based on pre-defined rules, and dependency information to extract aspects. Despite the fact that such approaches are unsupervised, they heavily depend on predefined rules, which work well only when the aspect terms are restricted to a small group of nouns. On the other hand, supervised approaches (requiring labelled data) generally model the problem as a sequence labeling task, and propose to use hidden markov models, or conditional random fields. Unsupervised methods have been subsequently proposed to perform aspect extraction and categorization at the same time. Most existing works are variants of LDA. More recently, a restricted boltzmann machine based model has been proposed to simultaneously extract aspects and relevant sentiments. However, all of those approaches do not directly encode the preference for semantic coherence, and ultimately provide aspects with loosely related terms.

One of the more successful applications of representation learning in natural language processing (NLP) is word embedding. The most widely used hypothesis for learning word embeddings is the distributional hypothesis, which assumes that words occurring in similar contexts tend to have similar meanings. It has been shown that word embeddings learned under this hypothesis are able to capture both syntactic and semantic regularities. The current dominant approach for learning word embeddings is the neural language models. Recently, attention models have been used to improve many neural NLP tasks, and enable the model to focus on local parts rather than the entire sentence.

The end goal of aspect discovery and extraction is a set of aspects that the human user finds agreeable. To achieve the end goal, and overcome the above limitations of known approaches, implementations of the present disclosure emulate mechanisms that human users may plausibly use in abstracting out aspects that they consider appropriate for describing a document. Neural models, which seek to emulate some of the outcomes of human information processing, are appropriate candidates for this purpose. Instead of modeling such mechanisms at the neural level, implementations of the present disclosure enable modeling based on abstract notions of the mechanisms. In particular, implementations of the present disclosure focus on the notions of distributional semantics and attention models. Distributional semantics is based on the idea that words occurring in the same contexts have similar meanings. Distributional semantics can be realized by word embeddings (e.g., such as those provided using Word2vec, which can be described as a group of related models that are used to produce word embeddings). Distributional semantics can also be modeled using topic models, such as LDA.

In accordance with implementations of the present disclosure, and as described in further detail herein, distributed representations (embeddings) of aspects and words are learned, which capture the semantic similarities. By doing so, implementations of the present disclosure are able to encode the preference for aspect semantic coherence by encouraging words that are semantically related to be grouped into aspects. In accordance with implementations of the present disclosure, dimension reduction is used to extract the common factors among the embedded sentences, and to reconstruct each sentence through a linear combination of aspect embeddings. Further, implementations of the present disclosure use an attention model to further improve the coherence of aspects during training process. The attention model de-emphasizes words that are not part of any aspect, allowing the attention model to focus on aspect words. The attention model of the present disclosure is referenced herein as the attention-based aspect extraction (ABAE) model, or ABAE for short.

FIG. 1 depicts an example structure of an ABAE model in accordance with implementations of the present disclosure. Generally, the ABAE can be described as an overall architecture that includes sentence representation using an attention model, and that reconstructs sentence representation through an unsupervised objective (minimize reconstruction error). As described in further detail herein, the attention model is used in weight calculations for each word. Although attention models have been used in supervised applications, implementations of the present disclosure integrate the attention model into a neural model in an unsupervised setting.

Figure 2:
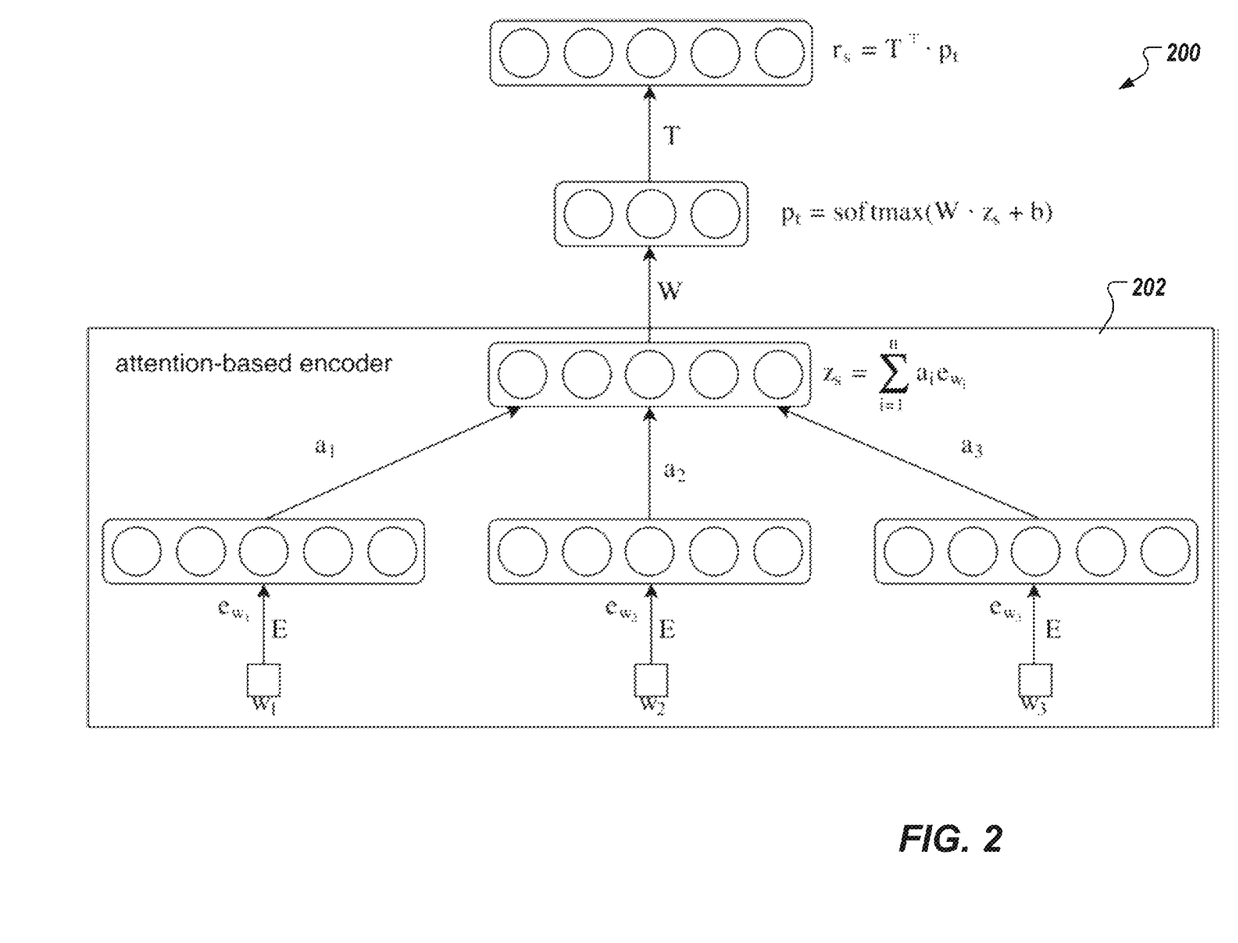
FIG. 2 depicts an example attention-based aspect extraction (ABAE) structure in accordance with implementations of the present disclosure.

FIG. 2 depicts an example ABAE structure 200 in accordance with implementations of the present disclosure. In the example of FIG. 2, an attention-based encoder 202 is provided, which provides a weighted parameter matrix W. As described in further detail herein, the weighted parameter matrix is determined from sentence embeddings, and is used to determine an aspect embedding matrix T. The aspect embedding matrix is used to provide reconstructed sentence embeddings, and the sentence embeddings and the reconstructed sentence embeddings are used to train the ABAE model.

In accordance with implementations of the present disclosure, the ABAE model learns a set of aspect embeddings, where each aspect can be interpreted by looking at nearest words (representative words) in the embedding space. In some implementations, each word w in a vocabulary is associated with a feature vector $e_w$ (where $e_w \in \mathbb{R}^d$). In some examples, the vocabulary is provided from a text corpus (e.g., review corpus), where the vocabulary is a sub-set of the text corpus (e.g., unique words in the corpus; removing punctuation symbols, stop words, and words appearing less than X times (10 times)). In some implementations, word embeddings are used for the feature vectors. For example, word embeddings have been shown to have good distributional semantics properties. The feature vectors corresponds to rows of a word embedding matrix $E \in \mathbb{R}^{V \times d}$, where V is the vocabulary size (e.g., the number of words in the vocabulary). In accordance with implementations of the present disclosure, embeddings of aspects that share the same embedding space with words are learned. To achieve this, implementations use an aspect embedding matrix $T \in \mathbb{R}^{K \times d}$, where K is the number of aspects defined (e.g., K=14). In some examples, K is much smaller than V. The aspect embeddings are used to approximate the aspect words in the vocabulary, and the aspect words are filtered through an attention mechanism.

In some implementations, each input sample to the ABAE is provided as a list of indexes for words in a sentence (e.g., a review sentence in a review corpus). Given such an input, multiple steps are performed, as depicted in FIG. 2. Non-aspect words are filtered by down-weighting the non-aspect words using an attention mechanism. A sentence embedding $z_s$ is constructed for each sentence using the weighted word embeddings. The sentence embedding is reconstructed as a linear combination of aspect embeddings from T, to provide a reconstructed sentence $r_s$. This process provides for dimension reduction and reconstruction, where ABAE transforms sentence embeddings of the filtered words ($z_s$) into respective reconstructed sentences ($r_s$) with the least possible amount of distortion, and preserving most of the information of the aspect words in the K embedded aspects.

In further detail, a sentence embedding $z_s$ (vector representation) is provided for each input sentence s. In general, the vector representation is to capture the most relevant information of the aspect (topic) of the sentence. In some implementations, the sentence embedding $z_s$ is determined as weighted summation of word embeddings $e_{w_i}$, i=1, ..., n corresponding to the word indexes in the sentence, using the following example relationship:

$$z_s = \sum_{i=1}^{n} a_i e_{w_i}$$

For each word $w_i$ in the sentence, a weight $a_i$ is determined. The weight $a_i$ can be described as the probability that $w_i$ is the correct word to focus on in order to capture the main topic (aspect) of the sentence. The weight $a_i$ is determined from an attention model, which conditions on the embedding $e_{w_i}$ of the word as well as the global context of the sentence. The weight can be determined using the following example relationships:

$$a_i = \frac{\exp(d_i)}{\sum_{j=1}^{n} \exp(d_j)}$$

$$d_i = e_{w_i}^T \cdot M \cdot y_s$$

$$y_s = \frac{1}{n} \sum_{i=1}^{n} e_{w_i}$$

where $y_s$ is the average of the word embeddings. In this manner, the global context of the sentence can be captured. In the above relationships, $M \in \mathbb{R}^{d \times d}$ is a matrix mapping between the global context embedding $y_s$, and the word embedding $e_w$, and is learned as part of the training process, described herein.

In some examples, the attention mechanism is a multi-step process. Given a sentence, a representation of the sentence is constructed by averaging all of the word representations. The weight of a word is assigned by filtering the word through the transformation M, which is able to capture the relevance of the word to the K aspects, and taking the inner product of the filtered word to the global context $y_s$ to capture the relevance of the filtered word to the sentence.

Having obtained the sentence embeddings, the reconstructions of the sentence embeddings are determined. As seen in FIG. 2, the reconstruction process includes multiple transitions. Intuitively, the reconstruction can be considered as a linear combination of aspect embeddings from T based on the following example relationship:

$$r_s = T^T \cdot p_t$$

where $r_s$ is the reconstructed vector representation, $p_t$ is the weight vector over K aspect embeddings, where each weight represents the probability that the input sentence belongs to the related aspect. In some examples, $p_t$ can be determined by reducing $z_s$ from d dimensions to K dimensions, and applying a softmax non-linearity that yields normalized non-negative weights based on the following example relationship:

$$p_t = \text{softmax}(W \cdot z_s + b)$$

where W is the weighted parameter matrix, and b is the bias vector, both of which are learned as part of the training process described herein.

In accordance with implementations of the present disclosure, the ABAE is trained to minimize reconstruction errors. In some examples, the contrastive max-margin objective function is used in the training process. For each input sentence, a random sample of m sentences is taken from the training data as negative samples. Each negative sample is represented as $n_i$, which is computed by averaging its word embeddings. The objective is to make the reconstructed embedding $r_s$ similar to the target sentence embedding $z_s$, while different from the negative samples. Therefore, the unregularized objective J is formulated as a hinge loss that maximizes the inner product between $r_s$ and $z_s$, and simultaneously minimizes the inner product between $r_s$ and the negative samples according to the following example relationship:

$$J(\theta) = \sum_{s \in D} \sum_{i=1}^{m} \max(0, 1 - r_s z_s + r_s n_i)$$

where D represents the training data set, and $\theta = \{E, T, M, W, b\}$ represents the model parameters.

Implementations of the present disclosure aim to learn vector representations of the most representative aspects for a dataset (text data). To avoid the resulting aspect embeddings being too similar to each other, implementations of the present disclosure add a regularization term to the objective function J to enforce the uniqueness of the aspect embeddings. The following example relationship can be considered:

$$U(\theta) = \|T \cdot T^T - I\|$$

where I is the identity matrix. The regularization term U enforces the orthogonality among rows of the aspect embedding matrix T. A final objective function L is obtained by adding J and U using the following example relationship:

$$L(\theta) = J(\theta) + \lambda U(\theta)$$

where $\lambda$ is a hyperparameter that controls the weight of the regularization term.

Figure 3:
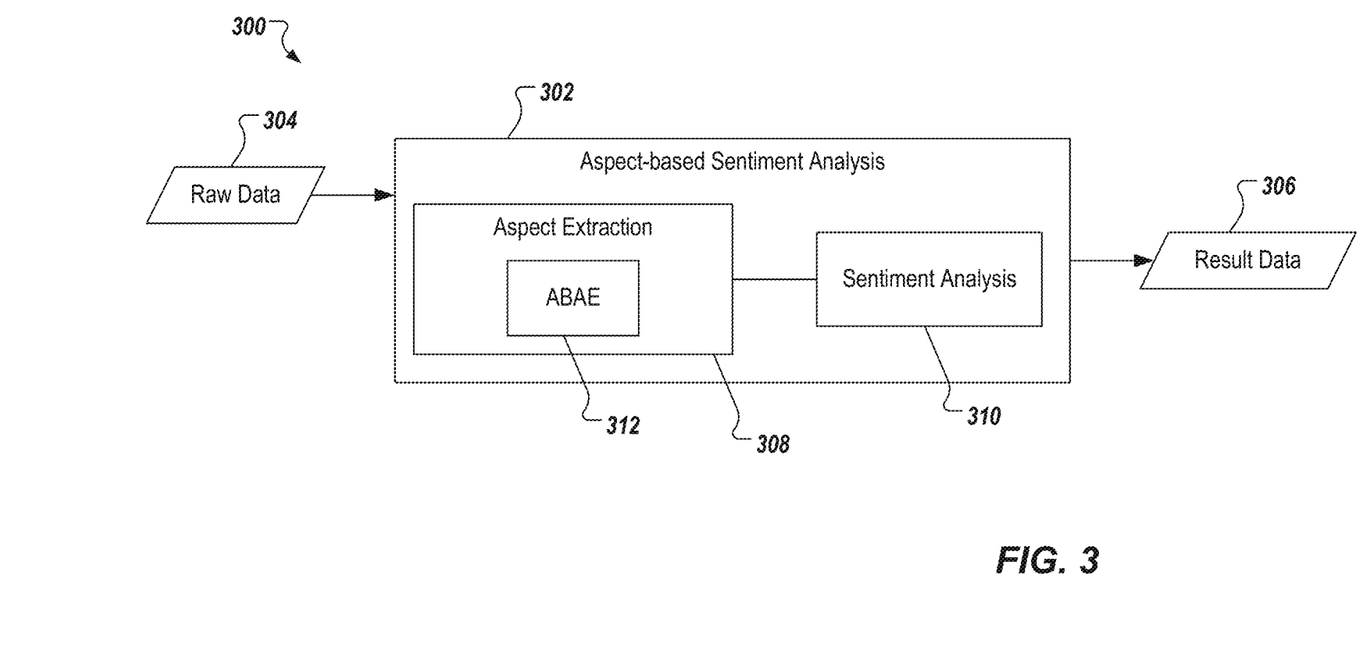
FIG. 3 depicts an example conceptual architecture in accordance with implementations of the present disclosure.

FIG. 3 depicts an example conceptual architecture 300 in accordance with implementations of the present disclosure. The example conceptual architecture 300 includes an aspect-based sentiment analysis module 302 that receives raw data 304 and provides result data 306. In the depicted example, the aspect-based sentiment analysis module 302 includes an aspect extraction sub-module 308, and a sentiment analysis sub-module 310. In some examples, the raw data 304 is provided as a text corpus (e.g., review text), and the aspect extraction sub-module 308 extracts aspects therefrom using the aspect extraction of the present disclosure, as described herein. In some examples, the sentiment analysis sub-module 310 processes the extracted aspects, and at least a portion of the raw data 304 to determine respective sentiments for each aspect. In some examples, the result data 306 includes aspects and their respective sentiments.

In the example of FIG. 3, and in accordance with implementations of the present disclosure, the aspect extraction sub-module 308 includes a ABAE model 312, which is trained and used to determine aspects, as described herein. For example, at least a portion of the raw data 304 is processed to provide sentence embeddings $z_s$ from weighted word embeddings $w_i$, and the sentence embeddings are processed to provide reconstructed sentence embeddings $r_s$, as described herein. The sentence embeddings and the reconstructed sentence embeddings are used to train the ABAE model 312, as described herein.

Figure 4:
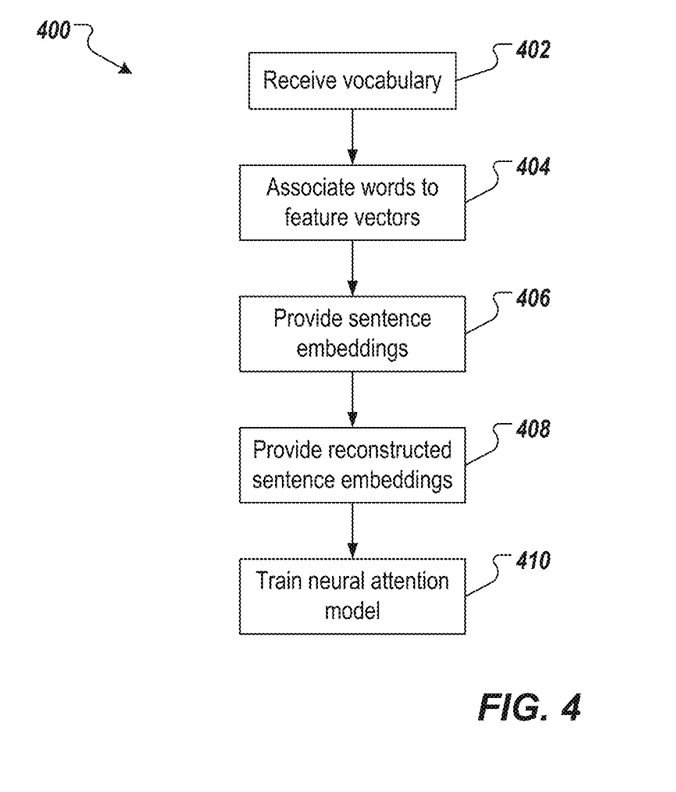
FIG. 4 depicts an example process that can be executed in accordance with implementations of the present disclosure.

FIG. 4 depicts an example process 400 that can be executed in accordance with implementations of the present disclosure. In some examples, the example process 400 can be provided by one or more computer-executable programs executed using one or more computing devices. In some examples, the example process 300 is executed for aspect extraction (inferring aspects) in an aspect-based sentiment analysis.

A vocabulary is received (402). In some examples, the aspect extraction sub-module 308 of the aspect-based sentiment analysis module 302 of FIG. 3 receives the vocabulary. For example, the vocabulary includes text data that is provided as at least a portion of raw data, the raw data being provided in a computer-readable file. In some examples, the raw data includes review data, as described by way of example herein. In some examples, the raw data is processed to provide the vocabulary. For example, a pre-processing module (not shown) of the aspect-based sentiment analysis module 302 can process the raw data (e.g., identify unique words in the corpus; removing punctuation symbols, stop words, and words appearing less than X times (10 times)) to provide the vocabulary to the aspect extraction sub-module 308. In some examples, the aspect extraction sub-module 308 can process the raw data to provide the vocabulary.

Each word in the vocabulary is associated with a respective feature vector (404). For example, the vocabulary is processed using Word2vec to provide a feature vector, as a word embedding, for each word. A sentence embedding is provided for each sentence of the vocabulary (406). For example, and as described herein, each sentence embedding is provided based on a plurality of feature vectors (e.g., for respective words in the respective sentence). Reconstructed sentence embeddings are provided (408). For example, and as described in detail herein, a reconstructed sentence embedding is provided for each sentence embedding based on dimension reduction and reconstruction process. The unsupervised neural attention model is trained based on the sentence embeddings and the reconstructed sentence embeddings (410). Accordingly, a trained neural attention model is provided, and is used to automatically determine aspects from the vocabulary.

Implementations of the present disclosure have been evaluated for performance using example test data. A summary of such evaluations is provided herein. The example test data included real-world datasets: Citysearch corpus, and BeerAdvocate corpus. The Citysearch corpus can be described as a widely used restaurant review corpus, which contains over 50,000 restaurant reviews from Citysearch New York. A subset of 3,400 sentences of the Citysearch corpus with manually labeled aspects is available. These annotated sentences are used for evaluation of the aspect extraction of implementations of the present disclosure. In the subset, there are six manually defined aspect labels: Food, Staff, Ambience, Price, Anecdotes, and Miscellaneous. The BeerAdvocate corpus can be described as a beer review corpus, which contains over one million reviews. A subset of 1,000 reviews, corresponding to 9,245 sentences of the BeerAdvocate corpus, are annotated with aspect labels. There are five manually defined aspect labels: Feel, Look, Smell, Taste, and Overall.

For each corpus, punctuation symbols, stop words, and words appearing less than 10 times in the corpus were removed. The word embedding matrix E was initialized with word vectors trained by Word2vec with negative sampling on each dataset, setting the embedding size to 200, window size to 5, and negative sample size to 5. The aspect embedding matrix T was initialized with centroids of clusters resulting from running k-means on word embeddings. Other parameters are initialized randomly. During the training process, the word embedding matrix E was fixed, and other parameters were optimized using stochastic optimization with a learning rate 0.001 for 15 epochs with batch size 50.

The number of negative samples per input sample m was set to 20, and the orthogonality penalty weight $\lambda$ was set to 1.

For the both the Citysearch corpus, and the BeerAdvocate corpus, the number of aspects was to 14. Further, each inferred aspect was manually mapped to one of the gold-standard aspects according to their top ranked representative words for both datasets. In ABAE, representative words of an aspect can be found by looking at its nearest words in the embedding space using cosine distance as the similarity metric.

For qualitative evaluation of aspect inference, aspects inferred using implementations of the present disclosure were compared to aspects inferred using each of LocLDA, and k-means. As noted above, the aspect matrix T is initialized by using the k-means centroids of the word embeddings. To evaluate ABAE with respect to k-means, ABAE's performance is compared to using the k-means centroids directly.

With regard to qualitative analysis, Table 1 presents all 14 aspects inferred by ABAE of the present disclosure for the restaurant domain (Citysearch corpus). Compared to gold-standard labels, the inferred aspects are more fine-grained. For example, ABAE of the present disclosure can distinguish main dishes from desserts, and drinks from food.

TABLE 1

| Inferred Aspects using Implementations of the Present Disclosure | | |
| --- | --- | --- |
| Inferred Aspects | Representative Words | Gold Aspects |
| Main Dishes | beef, duck, pork, mahi, filet, veal | Food |
| Dessert | gelato, banana, caramel, cheesecake, pudding, vanilla | |
| Drink | bottle, selection, cocktail, beverage, pinot, sangria | |
| Ingredient | cucumber, scallion, smothered, stewed, chilli, cheddar | |
| General | cooking, homestyle, traditional, cuisine, authentic, freshness | |
| Physical Ambience | wall, lighting, ceiling, wood, lounge, floor | Ambience |
| Adjectives | intimate, comfy, spacious, modern, relaxing, chic | |
| Staff | waitstaff, server, staff, waitress, bartender, waiter | Staff |
| Service | unprofessional, response, condescending, aggressive, behavior, rudeness | |
| Price | charge, paid, bill, reservation, came, dollar | Price |
| Anecdotes | celebrate, anniversary, wife, finance, recently, wedding | Anecdotes |
| Location | park, street, village, avenue, manhattan, brooklyn | Misc. |
| General | excellent, great, enjoyed, best, wonderful, fantastic | |
| Other | aged, reward, white, maison, mediocrity, principle | |

Table 2 depicts the top-ranked aspect words of ABAE, and the two baseline algorithms for three selected aspects, which gives an intuitive feel of the results from different models. Words that are inappropriately clustered are italicized. Because implementations of the present disclosure do not focus on separating aspect words and opinion words, a sentiment word is considered as correct as long as it is relevant to the respective aspect.

TABLE 2

| Top 11 Aspect Words in Three Selected Aspects | | | | | | | | |
| --- | --- | --- | --- | --- | --- | --- | --- | --- |
| Food | | | Staff | | | Ambience | | |
| ABAE | LocLDA | k-means | ABAE | LocLDA | k-means | ABAE | LocLDA | k-means |
| beef | chicken | meat | waitstaff | service | waiter | wall | room | quiet |
| duck | salad | stew | server | staff | host | lighting | bar | dark |
| pork | steak | beef | staff | friendly | waitress | ceiling | *restaurant* | decoration |
| mahi | dish | parm | waitress | waiter | *guy* | wood | *like* | enviroment |
| filet | sauce | boar | bartender | attentive | manner | lounge | *dining* | wall |

TABLE 2-continued

Top 11 Aspect Words in Three Selected Aspects

| Food | | | Staff | | | Ambience | | |
|---|---|---|---|---|---|---|---|---|
| ABAE | LocLDA | k-means | ABAE | LocLDA | k-means | ABAE | LocLDA | k-means |
| veal | appetizer | flavored | waiter | wait | managment | floor | decor | floor |
| salmon | shrimp | tough | service | *always* | polite | piano | *place* | space |
| brisket | delicious | stuffed | host | server | knowledgable | space | *nice* | cozy |
| catfish | soup | rabbit | owner | *food* | maitre | design | music | casual |
| monkfish | *like* | salmon | efficient | *nice* | arrogant | furniture | atmosphere | layout |
| sole | *ordered* | mushroom | employee | waitress | helpful | decoration | space | *walk* |

As can be seen in Table 2, both ABAE and k-means perform very well compared to LocLDA, and the aspects discovered by ABAE are more semantically coherent compared to those of k-means. For example, the top words of Staff discovered by ABAE are almost all job titles.

For quantitative evaluation of the resulting aspects discovered by the different methods, precision@n (p@n) is used to evaluate the word rankings, where n is a rank position. Table 3 shows the results for three major aspects of the restaurant domain.

TABLE 3

Average p@n for Three Selected Aspects

| Aspect | Method | p@20 | p@30 | p@50 |
|---|---|---|---|---|
| Food | ABAE | 0.910 | 0.886 | 0.872 |
| | LocLDA | 0.750 | 0.767 | 0.710 |
| | k-means | 0.883 | 0.855 | 0.813 |
| Staff | ABAE | 0.850 | 0.816 | 0.770 |
| | LocLDA | 0.525 | 0.450 | 0.490 |
| | k-means | 0.800 | 0.783 | 0.700 |
| Ambience | ABAE | 0.950 | 0.900 | 0.880 |
| | LocLDA | 0.750 | 0.767 | 0.720 |
| | k-means | 0.816 | 0.867 | 0.810 |

For each gold-standard aspect, p@n shown in Table 3, p@n was calculated by averaging the results of all inferred aspects that mapped to it. From the results, it is apparent that implementations of the present disclosure outperform LocLDA by relatively large margins for all ranked buckets.

The performance of sentence-level aspect identification was evaluated on both the restaurant domain and the beer domain using the annotated sentences of the respective corpora (i.e., 3,400 manually labeled sentences for the Citysearch corpus; 9,245 manually labeled sentences for the BeerAdvocate corpus). The evaluation criterion is to judge how well the predictions match the true labels, measured by precision, recall, and $F_1$ scores. For a given a review sentence, ABAE assigns it with an inferred aspect label, which associates with the highest weight in $p_t$, calculated as described above. The gold-standard label is assigned to the sentence according to the mapping between inferred aspects and gold standard labels.

With regard to the restaurant domain, single-label sentences were used for the performance evaluation to avoid ambiguity. Approximately 83% of labeled sentences have a single label. Further, three major aspects, namely, Food, Staff, and Ambience, were evaluated. Other aspects do not show clear patterns in either word usage or writing style, which can make those aspects difficult for even humans to identify. Results achieved using implementations of the present disclosure are compared with those of other published models, including MaxEnt-LDA (ME-LDA), SAS, and SERBM. In can be noted that SERBM has achieved state-of-the-art results for aspect identification on the restaurant corpus to date. The results for the restaurant domain are provided in Table 4.

TABLE 4

Aspect Identification - Restaurant Domain

| Aspect | Method | Precision | Recall | $F_1$ |
|---|---|---|---|---|
| Food | LocLDA | 0.898 | 0.648 | 0.753 |
| | ME-LDA | 0.874 | 0.787 | 0.828 |
| | SAS | 0.867 | 0.772 | 0.817 |
| | SERBM | 0.891 | 0.854 | 0.872 |
| | k-means | 0.927 | 0.637 | 0.755 |
| | ABAE | 0.941 | 0.741 | 0.829 |
| Staff | LocLDA | 0.804 | 0.585 | 0.677 |
| | ME-LDA | 0.779 | 0.540 | 0.638 |
| | SAS | 0.774 | 0.556 | 0.647 |
| | SERBM | 0.819 | 0.582 | 0.680 |
| | k-means | 0.789 | 0.616 | 0.629 |
| | ABAE | 0.791 | 0.722 | 0.755 |
| Ambience | LocLDA | 0.603 | 0.677 | 0.638 |
| | ME-LDA | 0.773 | 0.588 | 0.668 |
| | SAS | 0.780 | 0.542 | 0.640 |
| | SERBM | 0.805 | 0.592 | 0.682 |
| | k-means | 0.732 | 0.630 | 0.677 |
| | ABAE | 0.805 | 0.689 | 0.742 |

From Table 4, the following observations can be provided. In a first observation, implementations of the present disclosure outperforms all other models significantly for aspects Staff and Ambience with $F_1$ score improvements of 7.5% and 6.0% respectively compared to SERBM, even though SERBM was trained with a large amount of prior knowledge, and around 10% improvements on both aspects compared to other LDA-based models. The $F_1$ score of ABAE for Food is slightly worse than SERBM, while the precision is very high. An analysis of the errors reveals that most of the sentences that ABAE failed to recognize for Food are general descriptions without specific food words appearing. For example, the true label for the sentence "The food is prepared quickly and efficiently" is Food. However, ABAE assigns Staff to this sentence as the highly focused words according to the attention mechanism are quickly and efficiently, which are more related to Staff. In fact, although this sentence contains the word food, it is a general description of service. ABAE outperforms k-means significantly for this task, although both methods perform very well for extracting coherent aspects as shown in Table 4. This is due to the utilization of attention model in ABAE, which is able to capture the main topic of a sentence by only focusing on important words.

With regard to the beer domain, implementations of the present disclosure are compared with LocLDA, and a PALE LAGER (PL) model, which reported state-of-the-art results obtained by PL on the beer corpus. Both LocLDA and PL models take a number of hours to train on the data set, while implementations of the present disclosure only requires a few minutes to train. Accordingly, implementations of the present disclosure are also less resource intensive (e.g., in terms of computing resources) than the LocLDA and PL models.

The results for the beer domain are shown in Table 5.

TABLE 5

Aspect Identification - Beer Domain

| Aspect | Method | Precision | Recall | $F_1$ |
|---|---|---|---|---|
| Feel | PL | 0.789 | 0.763 | 0.776 |
|  | LocLDA | 0.938 | 0.528 | 0.675 |
|  | k-means | 0.690 | 0.895 | 0.779 |
|  | ABAE | 0.815 | 0.816 | 0.816 |
| Taste | PL | 0.628 | 0.794 | 0.701 |
|  | LocLDA | 0.399 | 0.659 | 0.497 |
|  | k-means | 0.593 | 0.814 | 0.686 |
|  | ABAE | 0.627 | 0.359 | 0.456 |
| Smell | PL | 0.779 | 0.672 | 0.722 |
|  | LocLDA | 0.550 | 0.439 | 0.488 |
|  | k-means | 0.844 | 0.283 | 0.424 |
|  | ABAE | 0.474 | 0.731 | 0.575 |
| Taste + Smell | PL | 0.809 | 0.903 | 0.854 |
|  | LocLDA | 0.652 | 0.871 | 0.746 |
|  | k-means | 0.796 | 0.808 | 0.802 |
|  | ABAE | 0.899 | 0.836 | 0.866 |
| Look | PL | 0.799 | 0.796 | 0.797 |
|  | LocLDA | 0.976 | 0.651 | 0.781 |
|  | k-means | 0.925 | 0.860 | 0.891 |
|  | ABAE | 0.960 | 0.892 | 0.925 |
| Overall | PL | 0.638 | 0.778 | 0.702 |
|  | LocLDA | 0.540 | 0.693 | 0.607 |
|  | k-means | 0.695 | 0.718 | 0.706 |
|  | ABAE | 0.650 | 0.816 | 0.724 |

In addition to the five gold-standard aspect labels, Taste and Smell were combined to form a single aspect–Taste+Smell. This is because the word rankings for these two aspects are very similar and many words can be used to describe both aspects. For example, the words spicy, bitter, fresh, sweet are top ranked words in both aspects, which makes it difficult for even humans to distinguish them. Because Taste and Smell are highly correlated and difficult to separate in real life, it was determined to treat them as a single aspect. From Table 5, it can be seen that implementations of the present disclosure significantly outperform LocLDA in $F_1$ scores on most aspects. Due to the issue discussed above, both LocLDA and implementations of the present disclosure perform worse than PL on Taste and Smell. However, when these two aspects are combined, implementations of the present disclosure outperform PL in $F_1$ score. Accordingly, the experimental results demonstrate the capability of implementations of the present disclosure in identifying separable aspects.

With regard to validating the effectiveness of the attention model, the weights of words assigned by the attention model for some example sentences are provided as follows:

| We | had | champagne | and | caviar | and | felt | like | princesses |
|---|---|---|---|---|---|---|---|---|
| 0 | 0 | 0.387 | 0 | 0.364 | 0 | 0.057 | 0.021 | 0.171 |

| This | place | is | always | very | crowded | and | popular |
|---|---|---|---|---|---|---|---|
| 0 | 0.041 | 0 | 0.023 | 0 | 0.753 | 0 | 0.183 |

| Friendly | staff | that | actually | lets | you | enjoy | your | meal |
|---|---|---|---|---|---|---|---|---|
| 0.164 | 0.717 | 0 | 0 | 0.046 | 0 | 0.052 | 0 | 0.021 |

As can be seen, the weights learned by the model correspond very strongly with human intuition. In order to evaluate how the attention model effects the overall performance of ABAE, experiments were conducted to compare ABAE and ABAE- on the aspect identification task, where ABAE- denotes the model, in which attention layer is switched off, and the sentence embedding is calculated by averaging its word embeddings using the following example relationship:

$$z_s = \frac{1}{n}\sum_{i=1}^{n} e_{w_i}$$

The results on the restaurant domain are shown in Table 6.

TABLE 6

Comparison between ABAE and ABAE-.

| Aspect | Method | Precision | Recall | $F_1$ |
|---|---|---|---|---|
| Food | ABAE- | 0.889 | 0.709 | 0.789 |
|  | ABAE | 0.941 | 0.741 | 0.829 |
| Staff | ABAE- | 0.748 | 0.616 | 0.676 |
|  | ABAE | 0.791 | 0.722 | 0.755 |
| Ambience | ABAE- | 0.782 | 0.641 | 0.705 |
|  | ABAE | 0.805 | 0.689 | 0.742 |

ABAE achieves substantially higher precision and recall on all aspects compared with ABAE-. These results demonstrate the effectiveness of the attention mechanism.

Figure 5:
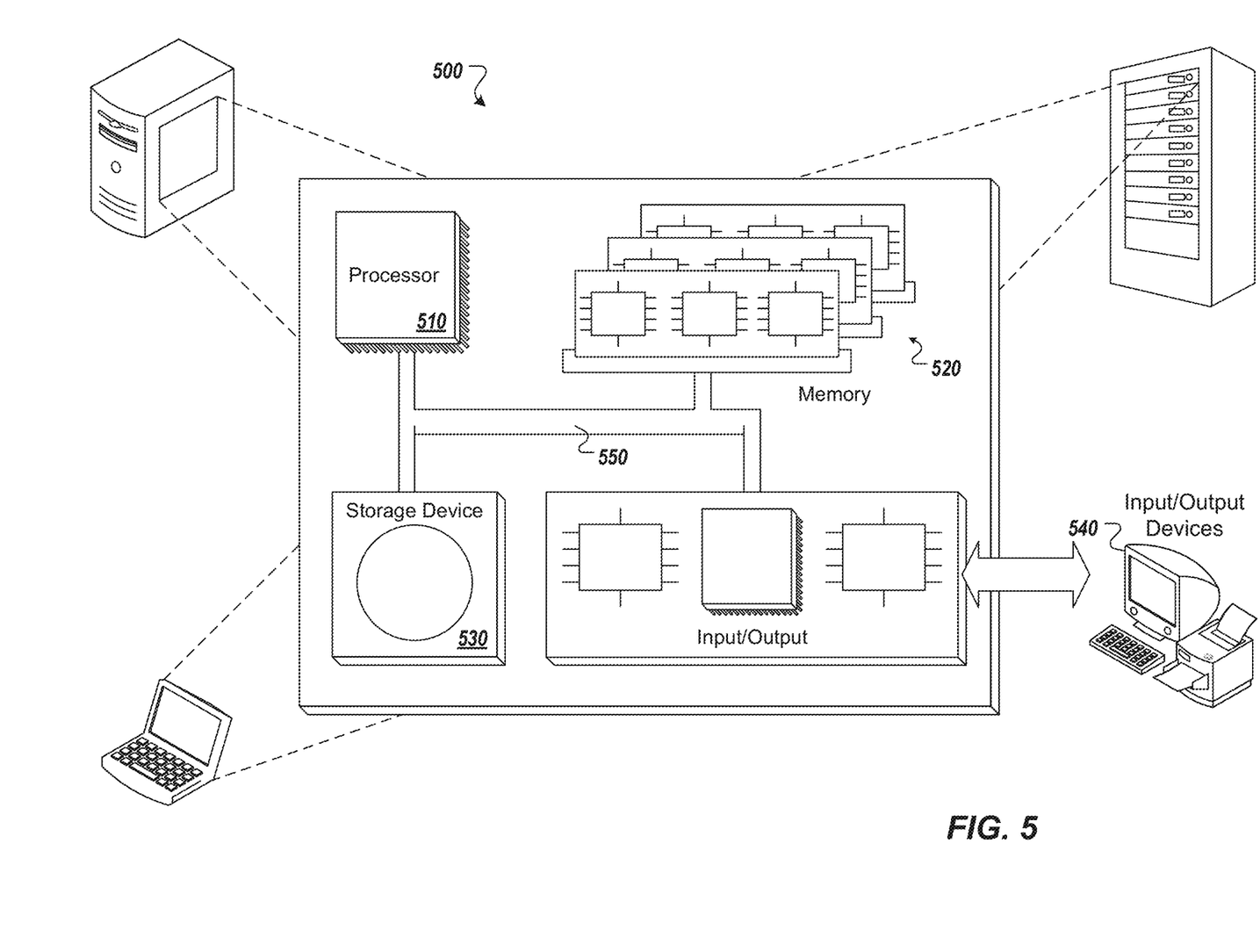
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for aspect extraction from raw data using an unsupervised neural attention model, the method being executed by one or more processors and comprising:
   receiving, by the one or more processors, a vocabulary, the vocabulary comprising text data that is provided as at least a portion of raw data, the raw data being provided in a computer-readable file;
   associating, by the one or more processors, each word in the vocabulary with a feature vector;
   providing, by the one or more processors, a sentence embedding for each sentence of the vocabulary based on a plurality of feature vectors to provide a plurality of sentence embeddings;
   providing, by the one or more processors, a reconstructed sentence embedding for each sentence embedding based on a weighted parameter matrix to provide a plurality of reconstructed sentence embeddings; and
   training, by the one or more processors, the unsupervised neural attention model based on the sentence embeddings and the reconstructed sentence embeddings to provide a trained neural attention model, the trained neural attention model being used to automatically determine aspects from the vocabulary, training comprising obtaining an objective function based on an unregularized objective, and a regularization term.

2. The method of claim 1, wherein each sentence embedding is provided by applying a respective weight to each feature vector, the respective weight indicating a probability that a respective word captures an aspect of the respective sentence, the weight being determined by an attention model.

3. The method of claim 1, wherein the unregularized function is obtained based on the sentence embeddings and the reconstructed sentence embeddings.

4. The method of claim 1, wherein each reconstructed sentence embedding is provided by dimension reduction and reconstruction of the respective sentence embedding.

5. The method of claim 1, wherein each feature vector is provided as a word embedding.

6. The method of claim 1, wherein the raw data comprises review data.

7. A non-transitory computer-readable storage medium coupled to one or more processors and having instructions stored thereon which, when executed by the one or more processors, cause the one or more processors to perform operations for aspect extraction from raw data using an unsupervised neural attention model, the operations comprising:

receiving a vocabulary, the vocabulary comprising text data that is provided as at least a portion of raw data, the raw data being provided in a computer-readable file;

associating each word in the vocabulary with a feature vector;

providing a sentence embedding for each sentence of the vocabulary based on a plurality of feature vectors to provide a plurality of sentence embeddings;

providing a reconstructed sentence embedding for each sentence embedding based on a weighted parameter matrix to provide a plurality of reconstructed sentence embeddings; and training the unsupervised neural attention model based on the sentence embeddings and the reconstructed sentence embeddings to provide a trained neural attention model, the trained neural attention model being used to automatically determine aspects from the vocabulary, training comprising obtaining an objective function based on an unregularized objective, and a regularization term.

8. The computer-readable storage medium of claim 7, wherein each sentence embedding is provided by applying a respective weight to each feature vector, the respective weight indicating a probability that a respective word captures an aspect of the respective sentence, the weight being determined by an attention model.

9. The computer-readable storage medium of claim 7, wherein the unregularized function is obtained based on the sentence embeddings and the reconstructed sentence embeddings.

10. The computer-readable storage medium of claim 7, wherein each reconstructed sentence embedding is provided by dimension reduction and reconstruction of the respective sentence embedding.

11. The computer-readable storage medium of claim 7, wherein each feature vector is provided as a word embedding.

12. The computer-readable storage medium of claim 7, wherein the raw data comprises review data.

13. A system, comprising:

a computing device; and a computer-readable storage device coupled to the computing device and having instructions stored thereon which, when executed by the computing device, cause the computing device to perform operations for aspect extraction from raw data using an unsupervised neural attention model, the operations comprising:

receiving a vocabulary, the vocabulary comprising text data that is provided as at least a portion of raw data, the raw data being provided in a computer-readable file;

associating each word in the vocabulary with a feature vector;

providing a sentence embedding for each sentence of the vocabulary based on a plurality of feature vectors to provide a plurality of sentence embeddings;

providing a reconstructed sentence embedding for each sentence embedding based on a weighted parameter matrix to provide a plurality of reconstructed sentence embeddings; and training the unsupervised neural attention model based on the sentence embeddings and the reconstructed sentence embeddings to provide a trained neural attention model, the trained neural attention model being used to automatically determine aspects from the vocabulary, training comprising obtaining an objective function based on an unregularized objective, and a regularization term.

14. The system of claim 13, wherein each sentence embedding is provided by applying a respective weight to each feature vector, the respective weight indicating a probability that a respective word captures an aspect of the respective sentence, the weight being determined by an attention model.

15. The system of claim 13, wherein the unregularized function is obtained based on the sentence embeddings and the reconstructed sentence embeddings.

16. The system of claim 13, wherein each reconstructed sentence embedding is provided by dimension reduction and reconstruction of the respective sentence embedding.

17. The system of claim 13, wherein each feature vector is provided as a word embedding.

* * * * *